United States Patent
Martinez Martinez et al.

(10) Patent No.: US 8,900,545 B2
(45) Date of Patent: Dec. 2, 2014

(54) PROCESS FOR THE PRODUCTION OF HIGH PURITY MAGNESIUM HYDROXIDE

(75) Inventors: Jesús Manuel Martinez Martinez, Torreón (MX); Herlindo Ortiz Ortega, Torreón (MX); Ricardo Benavides Pérez, Torreón (MX); José Gertrudis Bocanegra Rojas, Torreón (MX)

(73) Assignee: Servicios Administrativos Penoles S.A. de C.V., Coahuila (MM)

( * ) Notice: Subject to any disclaimer, the term of this patent is extended or adjusted under 35 U.S.C. 154(b) by 940 days.

(21) Appl. No.: 13/062,242

(22) PCT Filed: Sep. 5, 2008

(86) PCT No.: PCT/MX2008/000117
§ 371 (c)(1),
(2), (4) Date: Apr. 27, 2011

(87) PCT Pub. No.: WO2010/027247
PCT Pub. Date: Mar. 11, 2010

(65) Prior Publication Data
US 2011/0195017 A1      Aug. 11, 2011

(51) Int. Cl.
C01B 13/14 (2006.01)
C01F 5/02 (2006.01)
C01F 5/14 (2006.01)
C01F 11/02 (2006.01)
C01F 1/00 (2006.01)
C01F 5/00 (2006.01)
C01F 11/00 (2006.01)
C22B 26/20 (2006.01)
C01F 5/16 (2006.01)
C01F 5/22 (2006.01)

(52) U.S. Cl.
CPC ........................................ *C01F 5/22* (2013.01)
USPC ............ 423/636; 423/158; 423/164; 423/169

(58) Field of Classification Search
CPC .............. C01F 5/14; C01F 5/145; C01F 5/16; C01F 5/20; C01F 5/22
USPC .......... 423/155, 158, 164, 169, 635, 636, 644
See application file for complete search history.

(56) References Cited

U.S. PATENT DOCUMENTS

| | | | | |
|---|---|---|---|---|
| 2,178,983 A | * | 11/1939 | Fritz Wienert | 423/164 |
| 2,801,155 A | * | 7/1957 | Otto Kippe | 423/162 |
| 4,693,872 A | * | 9/1987 | Nakaya et al. | 423/164 |
| 5,362,460 A | * | 11/1994 | Laird et al. | 423/157.4 |

FOREIGN PATENT DOCUMENTS

| | | | | |
|---|---|---|---|---|
| CN | 101219800 A | * | 7/2008 | |
| ES | 2020135 A | * | 7/1991 | |
| JP | 60103023 A | * | 6/1985 | |

* cited by examiner

*Primary Examiner* — Anthony J Zimmer
(74) *Attorney, Agent, or Firm* — Michael J. Brown

(57) ABSTRACT

This invention refers to a novel process for obtaining high purity magnesium hydroxide from a solid starting material containing magnesium in the form of, and/or combined with, carbonates, oxides and/or hydroxides, either natural or synthetic. The process comprises leaching the starting material to dissolve the magnesium; the solution is treated with alkali to precipitate the high purity magnesium hydroxide, and the remaining mother liquor is fed to a regeneration step of both the alkali used in the precipitation of high purity magnesium hydroxide, and the acid for leaching. The process of the invention is characterized by recycling reactants (acid and alkali) regenerated in the same process.

9 Claims, 1 Drawing Sheet

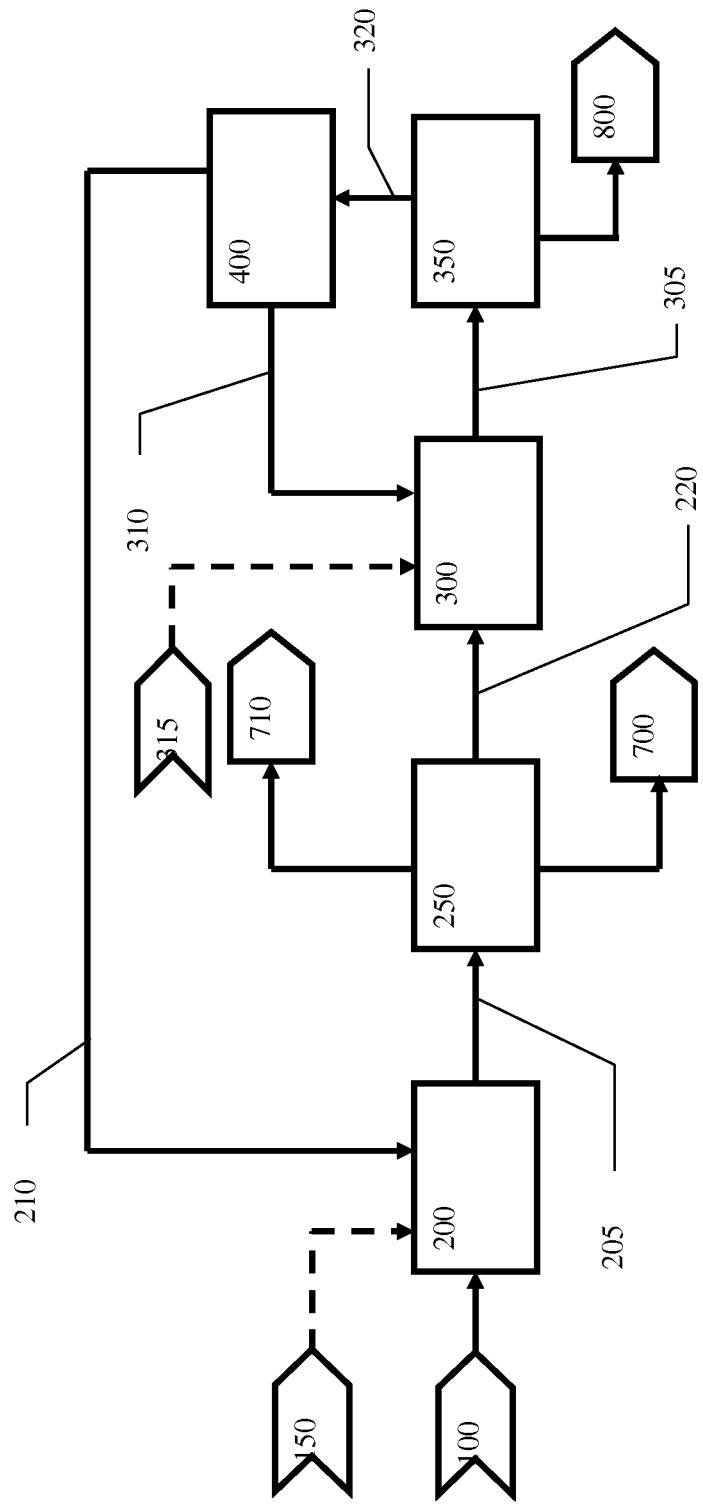

PROCESS FOR THE PRODUCTION OF HIGH PURITY MAGNESIUM HYDROXIDE

TECHNICAL FIELD OF THE INVENTION

The present invention relates to the production of magnesium hydroxide, and more particularly refers to a process for obtaining $Mg(OH)_2$ of high purity from dolomites, by means of an acid and an alkali which are regenerated within an internal cycle of the same process.

BACKGROUND OF THE INVENTION

For the production of magnesium hydroxide, precipitation processes are known comprising the addition to a $Mg^{++}$ containing solution, including sea water, of an alkali such as soda, potash, aqueous ammonia, or lime. In these processes, the alkali is lost in the washing and purification steps of the magnesium hydroxide (Kirk-Othmer, Encyclopaedia of Chemical Technology, third Edition, vol 14, pp 629-631).

U.S. Pat. No. 2,801,155 (Kipper, 1957) describes the production of magnesium hydroxide from dolomites by reacting a dolomite with nitric acid and, in subsequent steps, additionally mixing with dolomite or ammonium gas for producing magnesium hydroxide, which precipitates, and calcium nitrate and/or ammonium nitrate. This process has the disadvantage that the acid used in the leaching of the dolomite, or the alkali used in the precipitation of the magnesium hydroxide are not regenerated.

U.S. Pat. No. 4,937,056 (Kirk et al., 1990) describes a process for the production of magnesium hydroxide from solids containing magnesium in the form of carbonate, hydroxide or oxide, with an impurities content of at least 5%, by leaching with a $SO_2$ solution. This process has the disadvantage that, in order to reduce impurities, gradual pH increments are made to precipitate such impurities selectively. The pH increments are of 0.5 units and, consequently, very sensitive controls are required in operating the process.

U.S. Pat. No. 6,214,313 (Berisko et al., 2001) discloses a process for the production of magnesium hydroxide from a stream originated in the desulphurization of fuel gases, which has the disadvantage that the magnesium sulphite of the solution must first be converted to sulphate by the addition of hydrogen peroxide and then, the magnesium sulphate is precipitated with sodium hydroxide.

In some of the processes commonly used for the production of magnesium hydroxide, the starting material used is a solid compound which, upon reacting, produces impurities such as calcium sulphate, carbonate, hydroxide or oxide, all of which can be precipitated and dragged with the product, resulting in a low purity product. These processes are generally energy intensive (demanding high electrical energy and fuel consumption) and the purity of the magnesium hydroxide produced depends directly on the purity of the starting materials used in the process.

As it can be observed, the above-mentioned processes do not guaranty the production of magnesium hydroxide of a purity enabling its use in demanding technical areas, such as the manufacture of pharmaceutical and food products, using starting materials not necessarily of high purity. Consequently, complex purification operations are required, such as the selective dissolution of undesired non-soluble substances. For instance, in U.S. Pat. No. 5,626,825 (Verri, 1997) a purification process of magnesium hydroxide is described by means of the addition of a chelating agent which traps the impurities contained in a magnesium hydroxide slurry, thus obtaining a purity of at least 98%. It should be noted that this process is intended for purifying a magnesium hydroxide product already produced. U.S. Pat. No. 4,693,872 (Nakaya et al., 1987) discloses a process for the production of high purity magnesium hydroxide starting from an impure magnesium hydroxide which, in a first step, is dissolved in a stream of calcium chloride resulting from the regeneration of ammonia in a subsequent step, and by the addition of carbon dioxide gas. This process has the disadvantages of requiring the handling of two gaseous streams and the requirement of hermetic equipment.

As can be observed from the above references, purification processes are normally carried out as an additional step in the production of magnesium hydroxide of low purity to obtain the desired purity degree.

The physical and chemical properties of byproducts or impurities resulting from the production of the magnesium hydroxide can be used advantageously in other technical fields such as water purification, as auxiliary filtering media for improving the quality of processed liquids, since they retain heavy metals, suspended particles and organic materials. Surprisingly, no advantage has been taken from these properties for the purification of the magnesium hydroxide during its production.

OBJECTS OF THE INVENTION

In view of the unresolved problems of the prior art, an object of the present invention is providing a novel process for obtaining high purity magnesium hydroxide.

Another object of the present invention is providing a process for obtaining high purity magnesium hydroxide wherein the purity degree of the product is not determined directly by the quality of the starting materials.

A further object of the present invention is providing a process in which, in stable operation, the alkali and the acid flows required for the production of the magnesium hydroxide are produced by regeneration in the same process.

The above and other objects of the invention will become apparent in light of the following description and the accompanying drawing which should be considered merely illustrative and not limitative of the scope of invention.

BRIEF DESCRIPTION OF THE DRAWING

FIG. 1 is a block diagram representing the flow of the process of the present invention.

DETAILED DESCRIPTION OF THE INVENTION

For a better understanding of the following description, it should be read in association with FIG. 1, which represents a block diagram of the process flow.

The process for obtaining magnesium hydroxide of the present invention is characterized in that the starting material (100) is a solid substance which could be a compound or a mixture, either natural or synthetic, containing magnesium in the form of carbonate, hydroxide or oxide. Preferred materials are Dolomite, Huntite, Brucite, Periclase, Dolime or Magnesite.

To achieve an optimum yield from the starting material used in the process of the invention, the highest possible surface area of the material should be exposed to the reactants, for instance, increasing the surface area by submitting the starting material to processes for reducing the particle size, thus enabling the increased extraction of magnesium.

The starting material (100) is fed to a leaching operation (200) with an acid selected from the group comprising sulphuric and hydrochloric acids such that the magnesium ion of the starting material remains in solution and a precipitate is formed with the other cations present in the starting material. Thus, if the starting material contains calcium, sulphuric acid should be used producing gypsum (dehydrated calcium sulphate) which precipitates.

The insoluble substances produced during the reaction of the starting material with the acid are used to carry away, during precipitation, impurities such as heavy metals, organic matter and suspended solids, while the magnesium ion remains in the purified solution.

The acid employed to conduct the reaction comes from two sources:

a) a stream (210) which is recycled from a subsequent "acid and alkali regeneration" step (400), and b) a stream of "fresh" acid (150) used for starting the process, making-up for losses or leakage and stoichiometric adjustment.

During the reaction, the acid is in a quantity sufficient for the full leaching of the magnesium contents in the starting material (100), that is, for achieving the full dissolution of the magnesium contained in the starting material (100).

Stream (205) resulting form the leaching (200) of the starting material (100) is separated (250) to produce:

i) a magnesium solution (220), ii) a stream (700) comprising the precipitated insoluble and inert substances contained in the starting material, and iii) a carbon gas (710) which is generated when using starting materials containing carbonates.

The separation step (250) ensures the purification of the reactants used in the reactor (300) and that stream (220) is a substantially pure solution of magnesium sulphate or chloride.

Although in the separation step (200) it is possible to use any known, commonly employed technique, filtration is preferred considering that the bed formed by the precipitated solids acts as a filtering medium additional to that provided in the equipment.

The magnesium solution (220) obtained by leaching (200) is fed to a reactor (300) where it is reacted with an alkali (310), preferably sodium hydroxide from the "acid and alkali regeneration" step (400), although other alkaline metal or alkaline earth hydroxides could be used, such as potassium hydroxide, provided the salt formed by substitution of $OH^-$ is soluble to prevent it from being carried away with the precipitated magnesium hydroxide.

During reaction (300) with alkali (310) of the magnesium solution (220) incoming from the separation step (250), a suspension of magnesium hydroxide is formed. This suspension (305) is subjected to solid-liquid (or phase) separation (350) from which high purity magnesium hydroxide is obtained as product (800). The separation (350) is made by conventional methods, such as filtration, settlement, centrifugation, etc.

When starting the process, since there is no regenerated alkali stream (310), it is necessary to use an external alkali source (315) for obtaining the high purity magnesium hydroxide.

Upon making a comparative analysis of the purity of the product obtained with the process of the present invention in comparison with that of a product obtained from a conventional process using dolomite as starting material and involving the same number of washing steps in identical operative conditions (temperature, pressure, washing fluid flow, equipment used, etc.), the results shown in Table 1 are obtained.

TABLE 1

COMPARATIVE ANALYSIS OF THE PURITY OF MAGNESIUM HYDROXIDE OBTAINED BY A CONVENTIONAL PROCESS AND BY THE PROCESS OF THE INVENTION*

| Product | Purity | $SO_4$ | Cl | CaO |
|---|---|---|---|---|
| $Mg(OH)_2$ (1) | 98.50% | 0.21% | 0.21% | 0.60% |
| $Mg(OH)_2$ (2) | 99.80% | 0.14% | 0.013% | 0.00% |

*Expressed in weight percent based on the dry product.

Where (1) refers to the product obtained by a conventional process and (2) to the product obtained by the process of the invention.

The advantage of the process of the invention, on repeatedly using regenerated reactants, lies in limiting the entry of impurities only to those carried by the magnesium source (mineral or synthetic) and, eventually, the "fresh" make-up acid, which are fed to the leaching step, and which are almost totally removed by means of stream (770).

The remaining mother liquor (320) is an aqueous solution of soluble sodium salts, and could be the salt formed by substitution of the $OH^-$ in the alkali. This solution is fed to the last "acid and alkali regeneration" step (400).

The regeneration of alkali and acid in step (400) is carried out by electrochemical decomposition of the solution (320) in hydroxide and sulphuric or hydrochloric acid, depending on the case, where the regenerated hydroxide is recycled to step (300) via stream (310) and the regenerated acid is recycled to step (200) via stream (210).

At the process start-up, the regenerated acid (210) and alkali (310) streams are not available, and the sole sources of acid and alkali are streams (150) and (315), respectively. These streams, during normal operation, will serve for making-up losses and leaks, and, as already mentioned above, in the case of the acid, for adjusting the stoichiometry of the reaction.

An example of the above described process of the invention is presented below.

As starting material, a natural dolomite is selected having the composition shown in Table 2, in an amount of 3.16 kg.

TABLE 2

COMPOSITION OF THE NATURAL DOLOMITE USED AS STARTING MATERIAL IN THE EXAMPLE.

| COMPONENT | WEIGHT % |
|---|---|
| $SiO_2$ | 0.06% |
| $CaCO_3$ | 58.44% |
| $Fe_2O_3$ | 0.03% |
| $MgCO_3$ | 41.38% |
| $Al_2O_3$ | 0.10% |

The starting material is ground to a particle size lower than 0.25 inches. The ground dolomite is placed in a reactor with stirring, to which "fresh" sulphuric acid solution with a 28% concentration is added, i.e., a concentration similar to that which will be obtained from the alkali and acid regeneration.

The composition of said acid is shown in Table 3.

TABLE 3

COMPOSITION OF THE "FRESH" SULPHURIC ACID USED IN THE FIRST LEACHING OF THE EXAMPLE.

| COMPONENT | WEIGHT % |
|---|---|
| Fe | 0.00042% |
| Se | 0.00046% |
| $NO_3$ | 0.00046% |
| $H_2SO_4$ | 26.0% |
| Hg | 0.000010% |
| C | 0.43% |
| $H_2O$ | 73.6% |

During the reaction, carbonic gas is generated from the dolomite decomposition, which is detected by a foam formed in the leaching process.

The resulting suspension is filtered using Whatman paper 40 as filtering medium with a pore size of 8 micra. The gypsum formed is separated from the mother liquor, which is mostly formed by a sodium sulphate solution and the impurities contained in the dolomite and the sulphuric acid.

The magnesium sulphate solution is placed in an stirred reactor and is reacted with a sodium hydroxide solution with a 26% concentration, i.e., a concentration similar to that which will be obtained form the alkali and acid regeneration. The composition of the sodium hydroxide solution is shown in Table 4.

TABLE 4

COMPOSITION OF THE SODIUM HYDROXIDE COMPOSITION USED IN THE FIRST REACTION OF THE EXAMPLE.

| COMPONENT | WEIGHT % |
|---|---|
| NaOH | 26.00% |
| $Na_2CO_3$ | 0.16% |
| Fe | 0.0003% |

The magnesium hydroxide suspension formed is separated from the mother liquor by centrifugation. The mother liquor, which is a solution of sodium sulphate, is held off for use in the regeneration.

The magnesium hydroxide cake is subjected to a series of washing steps to remove the remaining mother liquor.

The sulphuric acid and the sodium hydroxide are regenerated with the separated sodium sulphate solution in an electrodialysis cell which has two electrodes (anode and cathode) and pairs of selective membranes for cations and anions.

The regenerated soda is used in the subsequent reaction steps and only the necessary quantity will be replaced to compensate losses or leaks in the process, as remnant solution in the magnesium hydroxide cake. The regenerated sulphuric acid is used in the subsequent leaching steps of the magnesium present in the dolomite, but "fresh" acid should be added to compensate that consumed with the gypsum, and as remnant solution.

Table 5 shows the main components of the process streams, identified as in FIG. 1.

TABLE 5

MAIN COMPONENTS OF THE PROCESS STREAMS OF THE EXAMPLE.

| | Stream Identifier. Composition given in Kg. | | | | | | | | | | | |
|---|---|---|---|---|---|---|---|---|---|---|---|---|
| Component | 100 | 150 | 205 | 210 | 220 | 305 | 310 | 315 | 320 | 700 | 710 | 800 |
| $CaCO_3$ | 1.716 | | | | | | | | | | | 1.000 |
| $MgCO_3$ | 1.446 | | | | | | | | | | | |
| $H_2SO_4$ | | 3.364[1] | | 1.682 | | | | | | | | |
| | | 1.682[2] | | | | | | | | | | |
| $MgSO_4$ | | | 2.064 | | 2.064 | | | | | | | |
| $CaSO_4 \cdot 2H_2O$ | | | 2.952 | | | | | | | 2.952 | | |
| $CO_2$ | | | 0.755 | | | | | | | | 0.755 | |
| $Mg(OH)_2$ | | | | | | 1.000 | | | | | | |
| $Na_2SO_4$ | | | | | | | 2.436 | | 2.436 | | | |
| NaOH | | | | | | | | 1.372 | 1.372[3] | | | |

[1] This acid quantity is required when starting the process.

[2] In continuous operation, it is used for make-up.

[3] This stream is necessary only for the process start-up.

Based on the above description, a person skilled in the art will readily recognize that the term "hydroxide" refers to a strong alkali which can be regenerated by electrodialysis, and that the term "acid", although it has been exemplified as sulphuric and hydrochloric acids, may refer to other strong acids which can be regenerated by electrodialysis.

It should also be evident to a person skilled in the art, that the separation techniques described and exemplified may be replaced by other techniques commonly used in the technical field to which the present invention pertains, without exceeding the scope of the invention as defined in the following claims.

Having thus described the invention, the following is considered novel and consequently claimed:

1. A process for obtaining magnesium hydroxide from a starting material which is a solid mixture or compound containing magnesium in the carbonate, hydroxide or oxide form, characterized by the steps of:
   (a) leaching the starting material with an acid;
   (b) separating precipitated insoluble, inert substances and carbon dioxide from a magnesium solution, all resulting materials from the leaching of step (a);
   (c) reacting the magnesium solution obtained from the separation step (b) with an alkali;
   (d) separating the magnesium hydroxide formed as final product from a remaining liquid from step (c);
   (e) regenerating the acid and the alkali by electrodialysis of the remaining liquid material of step (d); and
   (f) recycling the regenerated acid to the leaching step (a) and the regenerated alkali to the reaction step (c).

2. A process for obtaining magnesium hydroxide as claimed in claim 1, wherein fresh acid is used for the leaching of the starting material.

3. A process for obtaining magnesium hydroxide as claimed in claim 1, wherein for the leaching of the starting material, a stream of fresh acid is fed in a quantity sufficient to compensate losses in the process and to adjust the stoichiometric requirements.

4. A process for obtaining magnesium hydroxide as claimed in claim 3, wherein the separation of the precipitated insoluble and inert substances is made by filtration.

5. A process for obtaining magnesium hydroxide as claimed in claim 1, wherein the alkali used comes from a source external to the process.

6. A process for obtaining magnesium hydroxide as claimed in claim 1, wherein in step (d) the resulting material from the reaction with alkali is fed to a solid-liquid separation operation where the solid phase is the magnesium hydroxide.

7. A process for obtaining magnesium hydroxide as claimed in claim 1, wherein the acid used is a strong acid selected from the group consisting of sulphuric acid and hydrochloric acid.

8. A process for obtaining magnesium hydroxide as claimed in claim 7, wherein when the starting material contains calcium and the acid used is sulphuric acid.

9. A process for obtaining magnesium hydroxide as claimed in claim 1, wherein the alkali is sodium hydroxide.

\* \* \* \* \*